United States Patent [19]
Yee et al.

[11] Patent Number: 5,449,126
[45] Date of Patent: Sep. 12, 1995

[54] METHOD AND APPARATUS FOR SNAP-ACTION, SPLIT-CORE ROLLER CLAMP

[76] Inventors: Chang J. Yee, 2 Vincent St., Billerica, Mass. 01821; David L. Cooper, 81 Babicz Rd., Tewksbury, Mass. 01876; Jerry F. Negrotti, 6 Roderick Ave., Beverly, Mass. 01915; Ronald W. Krohn, 66 Hurley Cir., Marlboro, all of Mass. 01752

[21] Appl. No.: 127,282

[22] Filed: Sep. 27, 1993

[51] Int. Cl.6 .................. B65H 18/10; B65H 75/28
[52] U.S. Cl. ................................................ 242/532.6
[58] Field of Search ............... 242/67.1 R, 67.3 R, 242/67.2, 74, 74.1, 74.2, 71.6, 71.8, 532.6

[56] References Cited
U.S. PATENT DOCUMENTS

| | | | |
|---|---|---|---|
| 2,373,704 | 4/1945 | Obolensky | 242/74.1 |
| 2,454,984 | 11/1948 | Bader | 242/74.1 |
| 2,487,479 | 11/1949 | Roehrl | 242/74.1 |
| 2,911,163 | 11/1959 | Warrick | 242/74 |
| 3,277,007 | 10/1966 | Schwardt | 242/74.1 |
| 3,794,254 | 2/1974 | Tarasenko et al. | |
| 3,978,495 | 8/1976 | Warscheit | |
| 4,094,474 | 6/1978 | Stollenwerk et al. | |
| 4,201,354 | 5/1980 | Masiello et al. | 242/67.3 R X |
| 4,330,096 | 5/1982 | Bartel et al. | |
| 4,346,856 | 8/1982 | Paietta | |
| 4,531,685 | 7/1985 | White | |
| 5,197,687 | 3/1993 | Yamada et al. | |

*Primary Examiner*—John P. Darling
*Attorney, Agent, or Firm*—Julie A. Krolikowski

[57] ABSTRACT

A roller is provided with a clamping mechanism that clamps into a closed position upon rotation of the roller in a winding direction, and unclamps into an open position upon rotation in an unwind direction. The roller has a split-core comprising two hollow, semicircular, core halves that toggle between the clamped and unclamped positions when pivoted about a pivot point that is concentric with the rotational axis of the roller. A snap-pivot mechanism provides a snap-action between the core halves by a leaf spring positioned between the core halves. The rotationally free core half is maintained in a fixed position by a pivoting retractable spring plunger engaging a tab on the core half, while the driven core half is rotated toward the fixed free core half, causing the leaf spring to snap to an over center position and clamp the core halves together.

13 Claims, 6 Drawing Sheets

METHOD AND APPARATUS FOR SNAP-ACTION, SPLIT-CORE ROLLER CLAMP

This application is related to copending application Ser. No. 07/127,283, filed Sep. 27, 1993, commonly assigned with the present invention.

BACKGROUND OF THE INVENTION

The present invention relates to a take-up cassette for web-like media, having a motor driven take-up reel with a core that is provided with a clamping mechanism for attaching the leading edge of a media strip to the core of the reel.

In the past, non-powered scroll style cassettes were used in which the media is simply pushed into a loose spiral in a cylindrical chamber. As the media is pushed into the loose spiral, the diameter of the cylindrical chamber expands. There are several problems that exist with this type of take-up cassette. For instance, the spiral type cassettes have a limited inner diameter in which it is difficult to get a tightly wrapped roll of media, therefore the take-up capacity is limited. Also, the soft photographic emulsion coating on film types of media is prone to scratching as the advancing media slides against itself as it is being coiled within the spiral. Further, the electrically insulated properties of typical spiral material, such as plastic coated spring steel, enhance the build up of static charges on the media as it is fed into the take-up cassette. Lastly, the force required to feed the media into the take-up cassette increases as the cassette becomes full, influencing the performance characteristics of the media transport system.

Media cassettes of the motor driven type have an advantage over the above spiral type take-up cassettes, in that the media can be tightly wound on the core of a motor driven take-up reel with the result that a greater quantity of media can be fed into a comparable size cassette. Also, the layers of media do not slide against each other as they do when the media is pushed into a spiral type cassette, thus decreasing the potential for scratching and electrostatic build-up.

A problem that exists in motor driven take-up cassettes having clamping mechanisms is that it is difficult to guide the leading edge of the media into the clamping mechanism due to the inherent curvature of the media The curvature becomes increasingly pronounced as the supply roll diminishes due to a decreasing diameter upon which the media supply is originally wound. The media's leading edge may also slip out of the clamping mechanism during the first revolution of the core.

It is a general object of the invention to provide a clamping mechanism with snap-action pivotal movement.

It is a specific object of the invention to temporarily restrict rotational movement of a rotationally free core half, while rotating a driven core half towards the free core half.

It is another specific object of the invention to reduce the amount of contaminating particles in an apparatus using the snap-pivot mechanism, by reducing friction and wear between moving parts.

It is a feature of the invention to have a layer of high friction thermoplastic on the pinching surface of the clamping mechanism thereby preventing material from slipping out of the clamping mechanism.

SUMMARY OF THE INVENTION

A method and apparatus for clamping a split-core of a roller, have a driven core half and a free core half of the split-core of the roller. The driven core half is rotated about a rotational axis towards the free core half while movement of said free core half about the rotational axis is restricted. The driven core half is snapped into engagement with the free core half so as to be in driving contact together.

BRIEF DESCRIPTION OF THE DRAWINGS

The features and objects of the invention will become apparent in the following description taken with the accompanying drawings, in which.

DETAILED DESCRIPTION OF THE INVENTION

Figure 1:
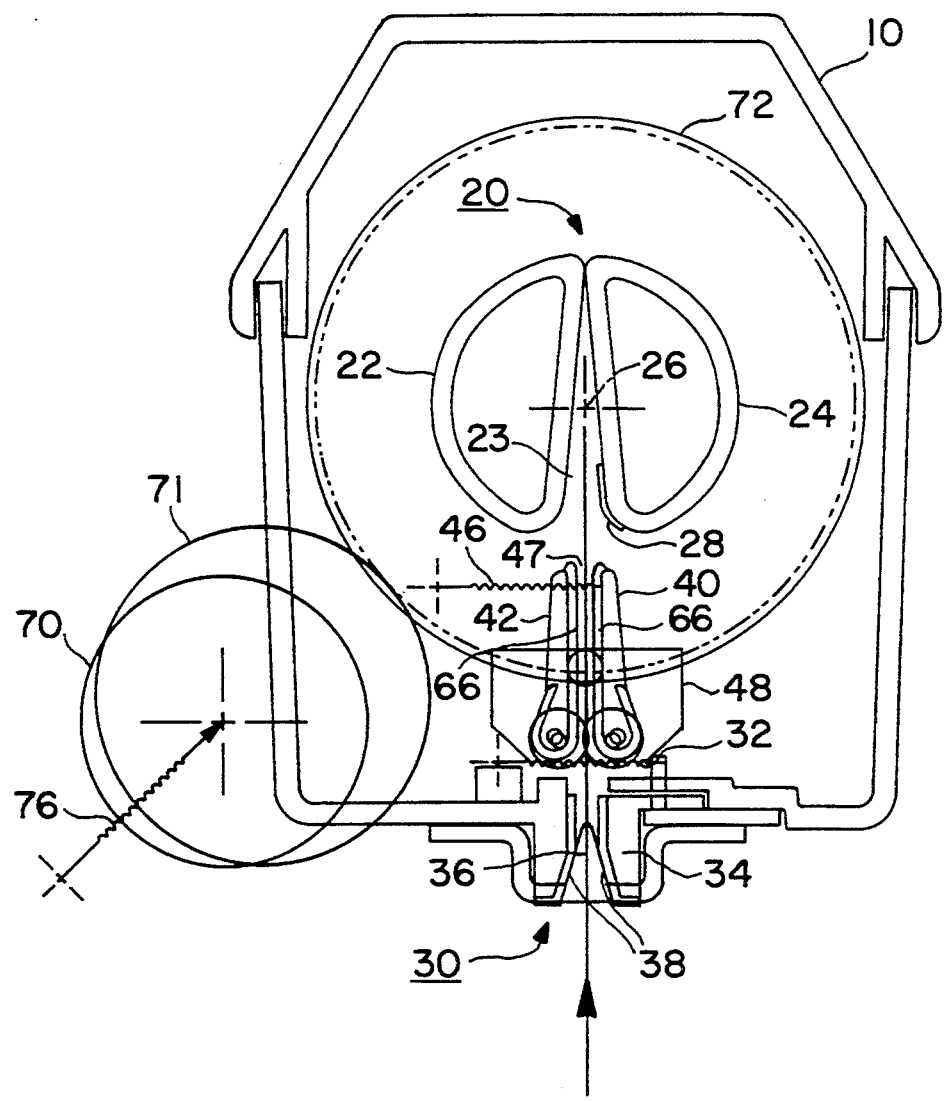
FIG. 1 is a sectional view of a powered take-up cassette, showing an initial stage of a clamping and winding operation.
Figure 3:
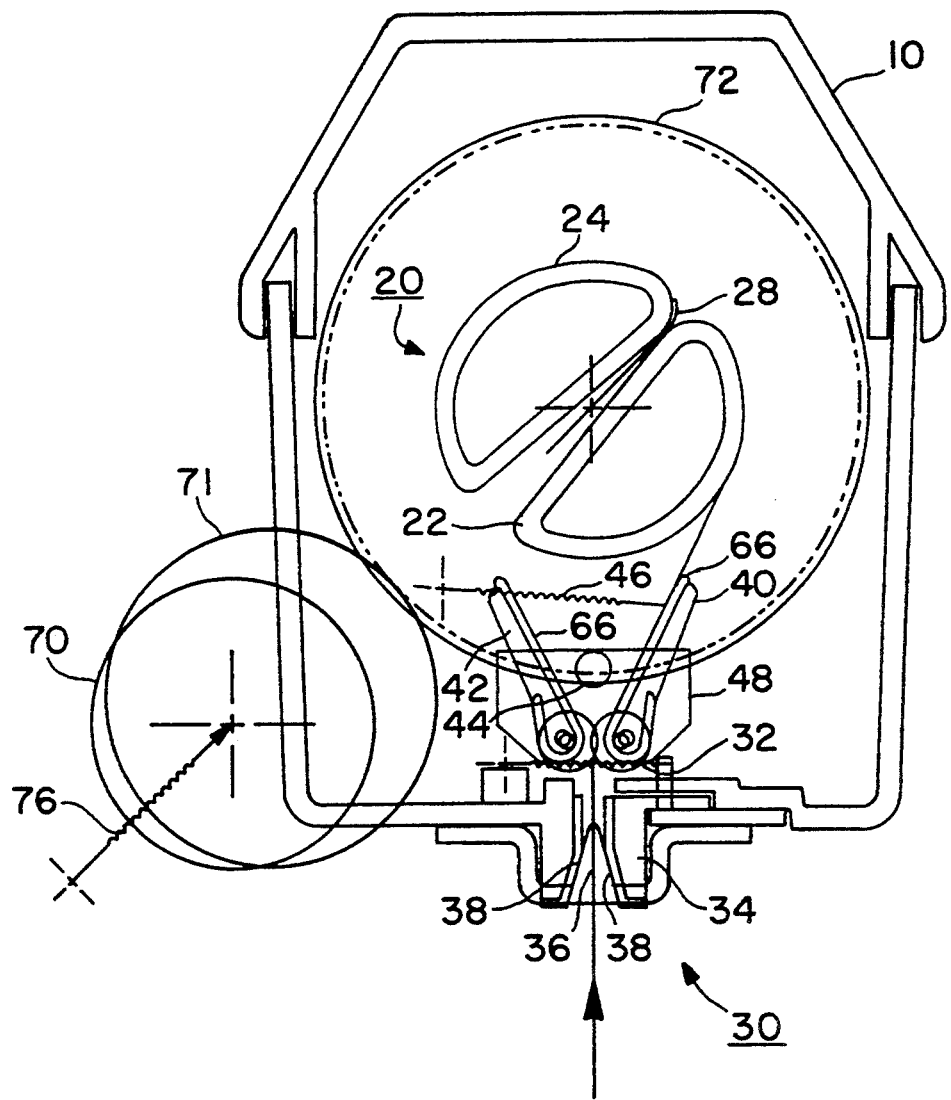
FIG. 3 is a sectional view similar to FIG. 1, but showing a subsequent stage of the winding and clamping operation.

Referring to FIG. 1, power assisted take-up cassette, hereinafter "PTC", is housed in a two piece light-tight enclosure 10. A core clamping mechanism, generally referred to by reference numeral 20, is located within the PTC. The core clamping mechanism 20 has two pivotable core halves 22, 24 that are hollow and semi-circular in cross-section. The core halves 22, 24 are separated by a slot 23 and form an open position (FIG. 1) and a closed, clamping position (FIG. 3). The core halves 22, 24 are toggled between the open and closed positions by a snap-pivot mechanism, shown in FIGS. 4-6 and described in a later section, that pivots the core halves 22, 24 about pivot point 26. The snap-pivot mechanism toggles the two halves 22, 24 into an open position when rotated in an unwind direction (clockwise as viewed in FIG. 1), and into a closed position when rotated in a wind direction (counterclockwise as shown in FIG. 3) such that the media will be gripped and pinched in between the pivotable core halves 22, 24.

One half 24 of the split-core 20 is coated with a layer of high friction thermoplastic 28 to prevent the media from slipping out from between the pivotable core halves 22, 24 during the first revolution of the media winding onto the core. Furthermore, the media is fed into the cassette initially at a rate faster than the split-core is wound, to ensure during the first few revolutions that the media will not experience undue tension and pull the leading edge of the media out from between the clamped core halves 22, 24.

An entrance latch assembly, generally referred to by reference numeral 30 is normally spring loaded in a closed position by a spring 32 to create a light-tight seal. A lever arm (not shown) mounted externally of the enclosure 10 is mechanically connected by simple linkages (not shown) to a sliding jaw 34 such that when the lever arm comes in contact with a metal mounting surface of the imaging device, the lever arm is actuated, causing the sliding jaw to open against the force of the spring 32. When the lever arm is not in contact with the mounting surface, the force of the spring 32 closes the entrance latch assembly 30.

When the sliding jaw is in an open position, a channel 36 is open for the media to be guided through. The chinreel 36 is covered with a plush material 38 that is electrically conductive. As the PTC is lowered onto the mounting surface, the channel 36 of the jaw 34 is opened and the plush material 38 comes into direct contact with the metal mounting surface, thereby creating a ground path for the PTC entrance.

The selection of this plush covered material enhances the performance of the PTC. The material is a silver coated nylon pile on a conductively coated cotton fabric backing. A suitable material manufactured by the Schlegel Corporation, Rochester, N.Y. is conductive plush #1385. To take full advantage of this material as a soft, non-scratching, statically conductive, media platen surface, it is electrically grounded by means of mechanical straps or contacts, or directly through the fabric by adhering it to the surface of the channel 36 with a conductive PSA tape like "3M" "SCOTCH BRAND" 9703.

Figure 2:
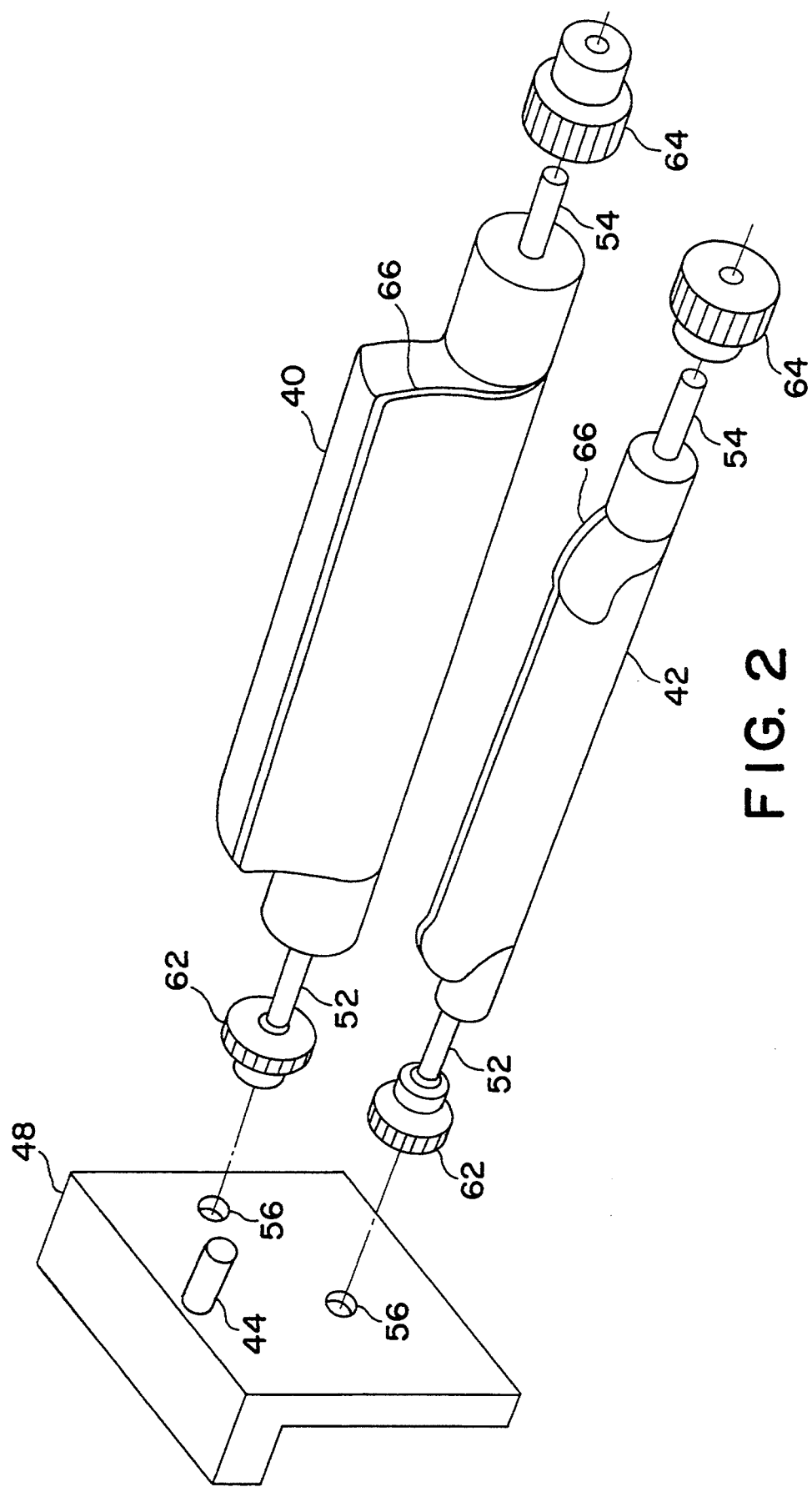
FIG. 2 is a perspective view of an assembly of two guides.

Referring to FIGS. 1 and 2, two retractable media guides 40, 42 are located above the entrance latch assembly 30, and are normally spring loaded closed by a spring 46, thereby defining a guide chute 47. The guides 40, 42 are nominally spaced apart by a pin 44 located in a pivot block 48, to allow the media to slide easily between the guides 40, 42 and through the guide chute 47. The guides 40, 42, each have two end shafts 52, 54 that are rotationally supported by holes 56 in the pivot blocks 48 (only one shown in FIG. 2). The guides are geared together at their bottom pivot point by gears 62, 64 mounted nonrotatably on shafts 52, 54 respectively, such that the guides open and close together forming a "V" shape. At least one of the guides 40 is covered with electrically conductive plush material 66, to bleed off any accumulated static charge build-up on the media when it is in contact with the media.

The take-up cassette is powered by a servo motor 70 that is external of the light-tight enclosure 10. The servo motor 70 has an offset shaft carrying a drive wheel 71. The drive wheel 71 drives an external friction wheel 72 that is mounted nonrotatably on a shaft end 84a of core half 22 (FIGS. 4 and 5) that passes through the light-tight enclosure 10. The servo motor 70 is spring loaded by a spring 76 in the direction of the friction wheel 72 so as to maintain contact therebetween.

The operation of the PTC begins when it is lowered into an imaging device or media transport device (not shown). The lever arm (not shown) is actuated by contact with the device mounting surface and the sliding jaw 34 is opened. The metal mounting surface directly contacts the conductive plush 38 covered channel 36 creating a grounded path. The sliding jaw 34 has inclined surfaces along the entrance channel 36, to guide media into the entrance latch assembly 30.

Prior to any media entering the PTC, the reset procedure or alignment of the core clamping mechanism 20 is performed. The slot 23 is positioned in line with the path of the media through the entrance latch assembly 30. The reset procedure is initiated by the device control system. The split core 20 is rotated in the unwind direction. The snap-pivot mechanism toggles the pivotable core halves 22, 24 into the open position shown in FIG. 1. Both halves 22, 24 continue to rotate while in the open position until an external photo interrupter switch (not shown) senses a reflective patch on the friction wheel 72 at which point the servo motor 70 is stopped. The split-core 20 is now aligned and in an open position as in FIG. 1 and the PTC is ready to accept media.

The leading edge of the media is now advanced into the PTC. The media enters the through the plush covered channel 36, passes through the chute 47 along the guides 40, 42, and enters aligned slot 23 in the split-core 20, about ⅔ to ¾ of the way up toward the top of the slot 23, as in FIG. 1. The split-core 20 is timed to start rotating in the wind direction after a sufficient amount of media is advanced into the slot. The split-core starts to rotate in the wind direction and the core halves 22, 24 are toggled to the closed position by the snap-pivot mechanism.

Referring to FIG. 3, as the media is wound onto the split core 20, the media is pulled from the guides 40, 42 in a direction tangent to the split-core 20. The tension in the advancing media against the guide 40 causes the guides 40, 42 to rotate open. Contact between the media and one plush covered guide 40 is maintained by the force of the spring 46 that urges the guides 40, 42 closed. This contact helps keep the wrap tight on the winding core 20 and bleeds off any accumulated static charge build-up on the media.

During normal imaging operations, image feeds are sequentially wound onto the core in a continuous web. The servo motor 70 is operated under torque control which maintains a substantially constant web tension from the split core back into the imaging device. The maximum take-up capacity of the PTC is not limited by the winding mechanism, but rather by the largest outer diameter of wound media that the PTC enclosure 10 can accommodate.

Figure 4:
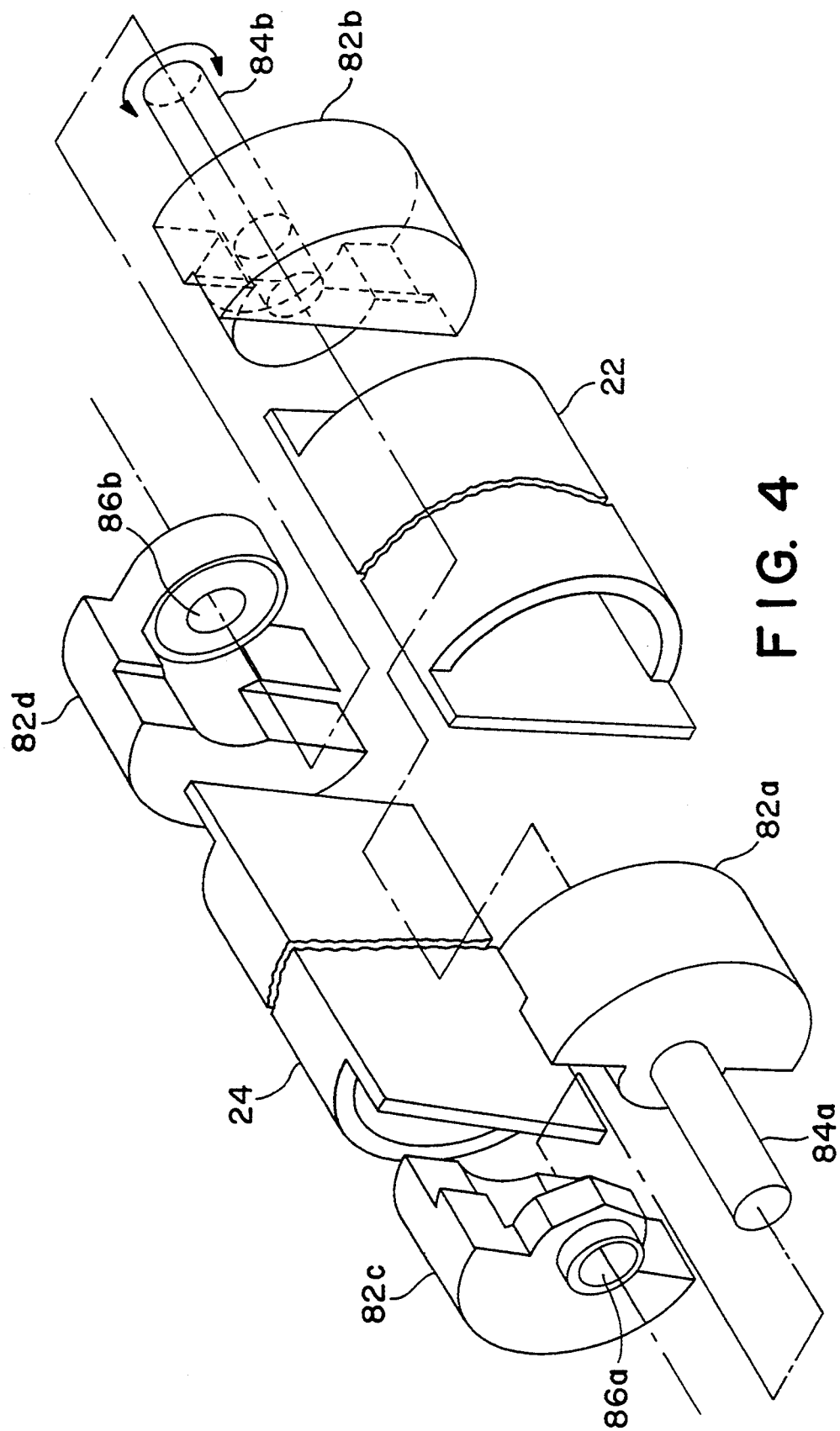
FIG. 4 is perspective view of an assembly of a split-core.

Now with reference to FIGS. 4-7, the snap-pivot mechanism will be described. Referring to FIG. 4, each pivotable core half 22, 24 has a flange mounted on each end 82a-d. The core half 22 has end flanges 82a, 82b provided with end shafts 84a, 84b, respectively, to drive the core half 22. The other core-half 24 has end flanges 82c, 82d, each provided with an aperture 86a, 86b, respectively, for the end shafts 84a, 84b of the driven core half 22 to pass through, respectively. The core half 24 rotates freely on the end shafts 84a, 84b of the driven core half 22.

Figure 5:
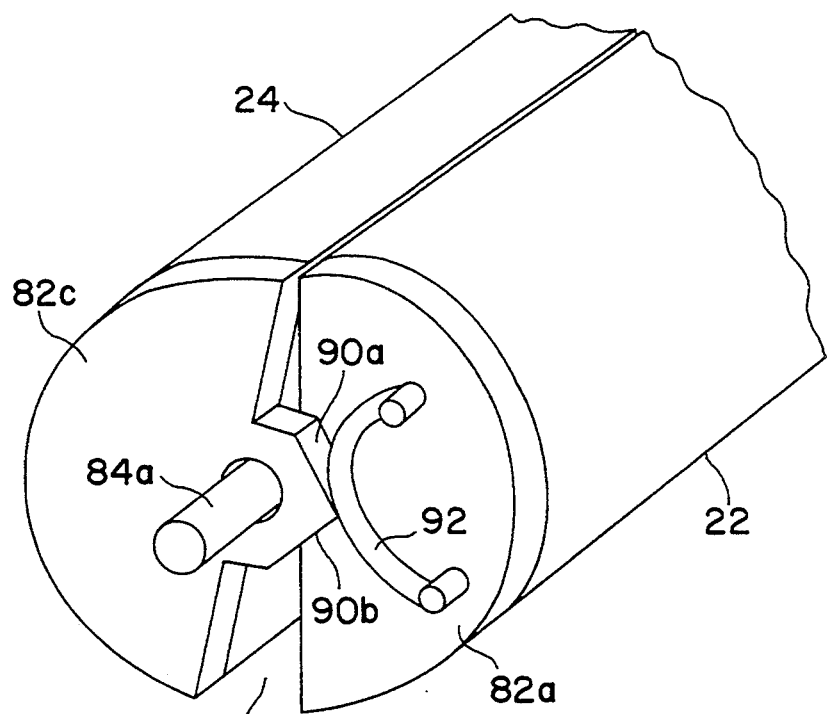
FIG. 5 is a perspective view of a preferred embodiment of a snap-pivot mechanism.

Referring to FIG. 5, flange 82c on the free core-half 22 has a protrusion with flats 90a, 90b formed thereon that cooperate with a leaf spring 92 mounted on flange 82a of the driven core-half 22 to provide a snap-pivot action between the two pivotable halves 22, 24. To snap-pivot the driven core-half 22 toward the free core-half 24 and effect the toggling of the core-halves 22, 24 into the open and closed positions, the free core-half 24 is held in a fixed position relative to the cassette enclosure 10 while the driven core-half 22 is rotated. Maintaining the position of the free core-half 24 causes the leaf spring 92 to overcome the overcenter position of the flats 90a, 90b and snap-pivot the core-halves 22, 24 into the open or closed position, depending on the direction of rotation of the driven core-half 22.

Figure 6:
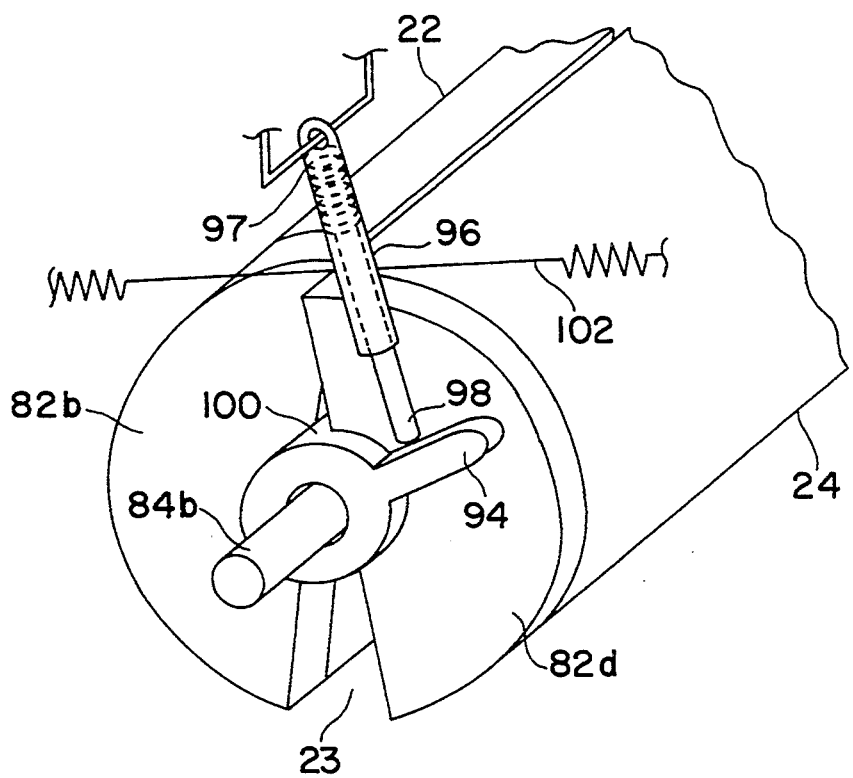
FIG. 6 is a perspective view of a retractable plunger restricting rotation of a free core half.

Referring to FIG. 6, at the opposite end of the split-core (the same end as viewed in FIGS. 1 and 3), the flange 82d on the free core-half 24 has a tab 94 extending radially outward. The tab 94 acts with a pivoting retractable spring plunger 96 that is mounted on the cassette enclosure 10. The plunger 96 pivots in a plane perpendicular to the axis of rotation of the split-core 20 and contacts the tab 94 as a stop during the first counter revolution of the driven core-half 22, thereby maintaining the free core-half 24 in a fixed position relative to the cassette enclosure 10. The tab 94 is strategically located so that the core-halves 22, 24, when in the open position and aligned with the entrance path of the media (FIG. 1), close immediately when the servo motor 70 reverses direction to wind the media.

The pivoting motion of the plunger 96 allows the tip 98 to follow the contour of the tab base 100 as it initially counter-rotates until the tab 94 is stopped by the plunger 96. For example, in FIG. 6 when the driven core 22 rotates counterclockwise, and in FIG. 5 when the driven core 22 rotates clockwise, the plunger 96 holds the free core-half 24 in place temporarily, until the snap action of the leaf spring 92 abuts the driven core-half 22 against the free core-half 24. As the driven core half 22 pushes the free core half, as viewed in FIG. 3, the tab 94 forces the plunger 96 to retract against the force of its spring 97, and the plunger 96 pivots to a position where it no longer acts as a stop (pivots to the left side of tab base 100 in FIG. 6). The plunger 96 rides on the periphery of the tab base 100 and tab 94 of the free core-half 24 as it rotates with a minimal amount of friction. The plunger 96 is restrained by a spring mechanism 102 that urges the tip 98 of the plunger 96 toward the tab base 100, thereby preventing gravity from having effect on the pivotal motion of the plunger 96 during handling of the PTC.

After the slot 23 has been aligned with the entrance channel, as in FIG. 1, the material is advanced into the slot 23 about ⅔ to ¾ of the way. The driven core half 22 is then rotated while the free core half 24 is held stationary by the plunger 96 engaging the tab 94 of the flange 82d. The tab 94 is located on the flange 82d in a position where the plunger 96 immediately engages the tab 94 after the alignment of the slot 23. This prevents the slot 23 from shifting position before the core halves 22, 24 are snapped together and thus prevents the web-like material from slipping out of the slot 23 prior to clamping.

The snap-pivot mechanism activates upon rotation of the driven core half 22, provided the slot 23 has been aligned properly. The driven core half 22 rotates towards restrained, free core half 24 a sufficient amount, causing an over-center position between the flats 90a, 90b and the leaf spring 92. The leaf spring 92 pops from one flat 90a to the other flat 90b. The driven core half 22 engages the free core half 24 in driving contact as the snap-pivot mechanism effectively clamps the material between the core halves 22, 24 (FIG. 3). The free core half 24 rotates with the driven core half 22 and the plunger 96 retracts against the force of the plunger spring 97. The plunger 96 is pushed over the tab base 100 where it rides along the outer periphery of the tab base 100 while the split-core rotates. A spring mechanism 102 (FIG. 6) prevents the plunger 96 from swinging away from the vicinity of the tab base 100. However the spring mechanism does not introduce a great deal of rotational resistance of wear into the system.

Figure 7:
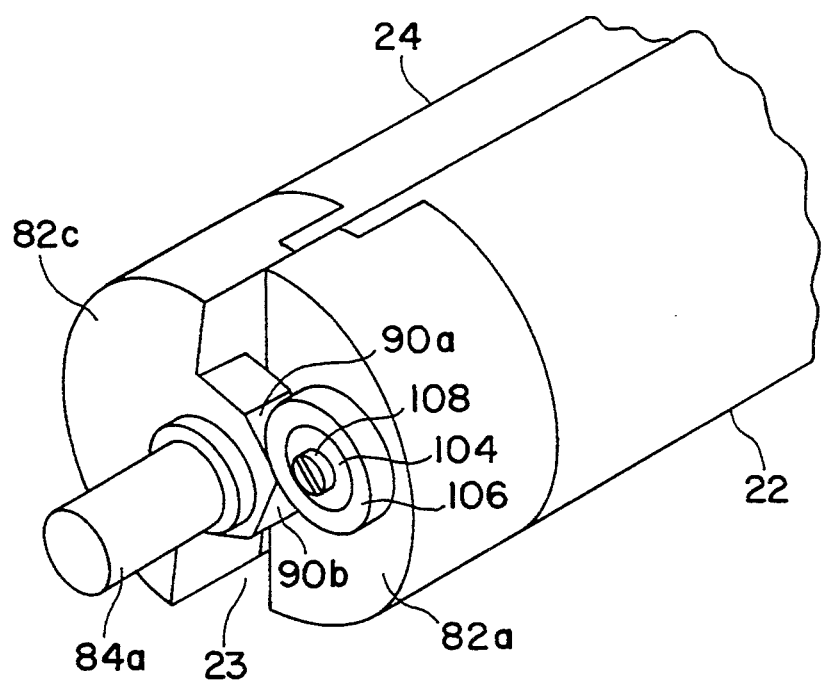
FIG. 7 is a perspective view of another embodiment of a snap-pivot mechanism.

Referring to FIG. 7, an alternative embodiment is shown that replaces the leaf spring 92 with a circular rubber bushing 104 and an annular bearing 106. The circular rubber bushing 104 is mounted inside of the annular bearing 106 and is rotatably mounted to the flange 82a of the driven core half 22 by a suitable means, such as a pin 108. The rubber bushing 104 provides a spring-like force on the bearing 106 and is compressible to allow the bearing 106 to switch positions from flat 90a to flat 90b with a snap-pivot action. The bearing 106 rolls against the flat 90a and the rubber bushing 104 compresses as the bearing 106 rolls over the protrusion to the other flat 90b. This embodiment operates in a substantially similar manner to the leaf spring 92 embodiment, however the rolling movement of the bearing 106 against the flats 90a, 90b creates less friction than the leaf spring 92 embodiment, thus reducing the amount of contaminating particles due to wear. This is an important feature in an imaging device where contaminating particles can scratch the media or affect the performance of the optical system.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by Letters of Patent of the United States are the following:

1. A method of clamping a split-core having a rotational axis about which a driven core half and a free core half rotate, rotating means for rotating said driven core half about said rotational axis, restricting means for restricting the movement of said free core half relative to said rotational axis, and snap-pivoting means for snapping said driven core half into engagement with said free core half, said method comprising the steps of:
   (a) rotating said driven core half with said rotating, means about said rotational axis towards said free core half while restricting movement of said free core half about said rotational axis with said restricting means;
   (b) snapping said driven core half into engagement with said free core half with said snap-pivoting means so as to be in driving contact; and,
   (c) overcoming said restricting means while rotating said free core half about said rotational axis through the driving contact of said driven core half being rotated about said rotational axis by said rotating means.

2. A method of clamping a split-core as in claim 1, wherein said step of restricting movement of said free core half about said rotational axis includes:
   abutting a tab on said free core half with a plunger which pivots about an axis parallel to said rotational axis thereby temporarily restricting rotational movement of said free core half.

3. A method of clamping a split-core as in claim 1, wherein said step of snapping said driven core half into engagement with said free core half includes:
   snapping a leaf spring mounted to said driven core half from a first flat side of a protrusion on said free core half, to a second flat side of the protrusion upon rotation of said driven core half, thereby inducing a snap-action of the driven core half towards the free core half.

4. An apparatus for clamping a split-core having a rotational axis about which a driven core half and a free core half rotate, comprising:

(a) rotating means for rotating said driven core half about said rotational axis towards said free core half and for rotating said free core half about said rotational axis through driving contact of said driven core half with said free core half;

(b) restricting means for restricting movement of said free core half about said rotational axis during rotation of said driven core half about said rotational axis toward said free core half; and, (c) snap-pivoting means for snapping said driven core half into engagement with said free core half so as to be in driving contact therewith, said rotating means thereafter rotating said free core half through said driving contact of said driven core half being rotated about said rotational axis by said rotating means.

5. An apparatus for clamping a split-core as in claim 4, wherein said restricting memos includes:

a tab on said free core half abutting a plunger which pivots about an axis parallel to said rotational axis thereby temporarily restricting rotational movement of said free core half.

6. An apparatus for clamping a split-core as in claim 4, wherein said snapping means comprises:

(a) a protrusion on said free core half having a first flat side and a second flat side; and, (b) a leaf spring mounted to said driven core half and engaged with said protrusion, said leaf spring adapted to snap from said first flat side to said second flat side upon rotation of said driven core half, thereby inducing a snap-action of said driven core half towards said free core half.

7. An apparatus for clamping a split-core as in claim 4, further comprising:

(a) a protrusion on said free core half having a first flat side and a second flat side; and, (b) a spring-loaded bushing rotatably mounted to said driven core half and engaged with said protrusion, said spring-loaded bushing adapted to roll against said first flat side to said second flat side upon rotation of said driven core half, thereby inducing a snap-action of said driven core half towards said free core half.

8. A split-core roller comprising:

(a) a first core half having a rotational shaft;

(b) a second core half rotatably mounted on said rotational shaft, said second core half being pivotable about said rotational shaft with respect to said first core half; and, (c) said first core half and said second core half defining a slot therebetween, said rotational shaft being centered in said slot, such that the first and second core halves pivot between a first position and a second position relative to each other, the first position having the core halves engaged at a first end of the slot and open at a second end of the slot, the second position having the core halves open at the first end of the slot and engaged at the second end of the slot.

9. The split-core roller of claim 8 further comprising:

(a) restricting memos for restricting movement of said second core half about said rotational shaft; and, (b) snapping means for snapping said first core half into engagement with said second core half while restricting said second core half.

10. The split-core roller of claim 8 wherein at least one of the core halves has a layer of high friction material.

11. The split-core roller of claim 8 wherein said split-core roller has a substantially circular cross-section.

12. The split-core roller of claim 8 wherein said first core half and said second core half have substantially identically shaped cross-sections.

13. The split-core roller of claim 12 wherein said cross-sections are semicircular.

* * * * *